United States Patent
Lee et al.

(10) Patent No.: US 9,851,608 B2
(45) Date of Patent: Dec. 26, 2017

(54) LIQUID CRYSTAL DISPLAY

(71) Applicant: Samsung Display Co., Ltd., Yongin-si (KR)

(72) Inventors: Seong Yeol Lee, Asan-si (KR); Yu-Jin Kim, Asan-si (KR); Jong Hwan Lee, Anyang-si (KR); Chil Son Hong, Seongnam-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 15/006,509

(22) Filed: Jan. 26, 2016

(65) Prior Publication Data
US 2016/0266448 A1     Sep. 15, 2016

(30) Foreign Application Priority Data
Mar. 9, 2015 (KR) ........................ 10-2015-0032793

(51) Int. Cl.
*G02F 1/1337* (2006.01)
*G02F 1/1343* (2006.01)
(Continued)

(52) U.S. Cl.
CPC ...... *G02F 1/134309* (2013.01); *G02F 1/1337* (2013.01); *G02F 1/13439* (2013.01);
(Continued)

(58) Field of Classification Search
CPC ......... G02F 1/134309; G02F 1/133345; G02F 1/1337; G02F 1/133707; G02F 1/13439;
(Continued)

(56) References Cited

U.S. PATENT DOCUMENTS 6,680,772 B2  1/2004  Lee
8,339,552 B2  12/2012  Han et al.
(Continued)

FOREIGN PATENT DOCUMENTS

KR  10-2002-0021296  3/2002
KR  10-2004-0107648  12/2004
(Continued)

OTHER PUBLICATIONS

Extended European Search Report dated May 27, 2016, corresponding to European Patent Application No. 16159065.8.

*Primary Examiner* — Nathanael R Briggs
(74) *Attorney, Agent, or Firm* — H.C. Park & Associates, PLC

(57) ABSTRACT

A liquid crystal display (LCD) including: a first electrode disposed on a first substrate; an insulating layer disposed on the first electrode; a second electrode disposed on the insulating layer, overlapping the first electrode, and including a plurality of branch electrodes; and a second substrate opposing the second substrate. Liquid crystal molecules of a liquid crystal layer disposed between the substrates are aligned to have pretilt angles in an alignment direction. The branch electrodes include a main branch portion forming a first angle with the alignment direction and a first center portion forming a second angle with the alignment direction, respectively. The branch electrodes include an outermost branch electrode, and the outermost branch electrode includes the main branch portion forming a first angle with the alignment direction and a second center portion forming a fourth angle with the alignment direction.

23 Claims, 30 Drawing Sheets

(51) Int. Cl.
*G02F 1/1333* (2006.01)
*G02F 1/1362* (2006.01)

(52) U.S. Cl.
CPC .. *G02F 1/133345* (2013.01); *G02F 1/133707* (2013.01); *G02F 1/136286* (2013.01); *G02F 2001/134372* (2013.01)

(58) Field of Classification Search
CPC ......... G02F 1/136286; G02F 1/134363; G02F 2001/134372
See application file for complete search history.

(56) References Cited

U.S. PATENT DOCUMENTS

| | | |
|---|---|---|
| 8,436,972 B2 | 5/2013 | Arai et al. |
| 8,619,226 B2 | 12/2013 | Huang et al. |
| 2010/0157222 A1* | 6/2010 | Arai ................ G02F 1/134363 349/123 |
| 2011/0149186 A1 | 6/2011 | Song et al. |
| 2013/0257700 A1* | 10/2013 | Chang ............... G02F 1/134363 345/87 |
| 2013/0342778 A1 | 12/2013 | Itou et al. |
| 2014/0043575 A1* | 2/2014 | Lee ................ G02F 1/134363 349/139 |

FOREIGN PATENT DOCUMENTS

| | | |
|---|---|---|
| KR | 10-2009-0020674 | 2/2009 |
| KR | 10-2010-0125924 | 12/2010 |

* cited by examiner

LIQUID CRYSTAL DISPLAY

CROSS-REFERENCE TO RELATED APPLICATION

This application claims priority from and the benefit of Korean Patent Application No. 10-2015-0032793, filed on Mar. 9, 2015, which is hereby incorporated by reference for all purposes as if fully set forth herein.

BACKGROUND

Field

Exemplary embodiments relate to a liquid crystal display.

Discussion of the Background

A liquid crystal display is currently one of the most widely used flat panel displays, and adjusts a magnitude of transmitted light by applying a voltage to an electrode to rearrange liquid crystal molecules of a liquid crystal layer.

The liquid crystal display has high resolution and good color fidelity, but has a drawback in that lateral visibility is inferior to front visibility. Accordingly, various methods of arranging and driving liquid crystals have been developed to overcome the drawback. A liquid crystal display where a pixel electrode and a common electrode are formed on the same substrate has received attention as a method of implementing a wide viewing angle.

In the liquid crystal display, at least one of two field generating electrodes of the pixel electrode and the common electrode has a plurality of cutouts, and a plurality of branch electrodes defined by a plurality of cutouts.

Meanwhile, if pressure and the like is applied from the outside of the liquid crystal display, irregular behavior of liquid crystal molecules occurs, and the irregular behavior of the liquid crystal molecules may move along the cutout of the field generating electrode. In order to prevent this, it is possible to prevent irregular behavior of the liquid crystal molecules from moving along the cutout of the field generating electrode by variously forming the angle between the cutout and a vertical standard line. However, as a result of variously forming the angle between the cutout and a vertical standard line, liquid crystal molecules rotated by electric fields generated by the cutouts may not be returned to an initial arrangement state. Accordingly, the irregular behavior of the liquid crystal molecules may occur in a region adjacent to the cutouts. This irregular behavior of the liquid crystal molecules is common in a region corresponding to edges of a pixel area. Transmittance of the liquid crystal display may be reduced by this irregular behavior of the liquid crystal molecules.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display preventing irregular behavior of the liquid crystal molecules common in the region corresponding to edges of branch electrodes and increasing transmittance of the liquid crystal display.

Additional aspects will be set forth in the detailed description which follows, and, in part, will be apparent from the disclosure, or may be learned by practice of the inventive concept.

An exemplary embodiment discloses a liquid crystal display (LCD) including: a first substrate; a first electrode disposed on the first substrate; an insulating layer disposed on the first electrode; a second electrode disposed on the insulating layer, overlapping the first electrode, and including a plurality of branch electrodes; a second substrate opposing the second substrate; and a liquid crystal layer disposed between the first substrate and the second substrate and including a plurality of liquid crystal molecules. The liquid crystal molecules are aligned to have pretilt angles in an alignment direction, the plurality of branch electrodes including a main branch portion forming a first angle with the alignment direction and a center portion forming a second angle with the alignment direction, respectively. The second angle of the center portion has a different value according to dispositions of the plurality of branch electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
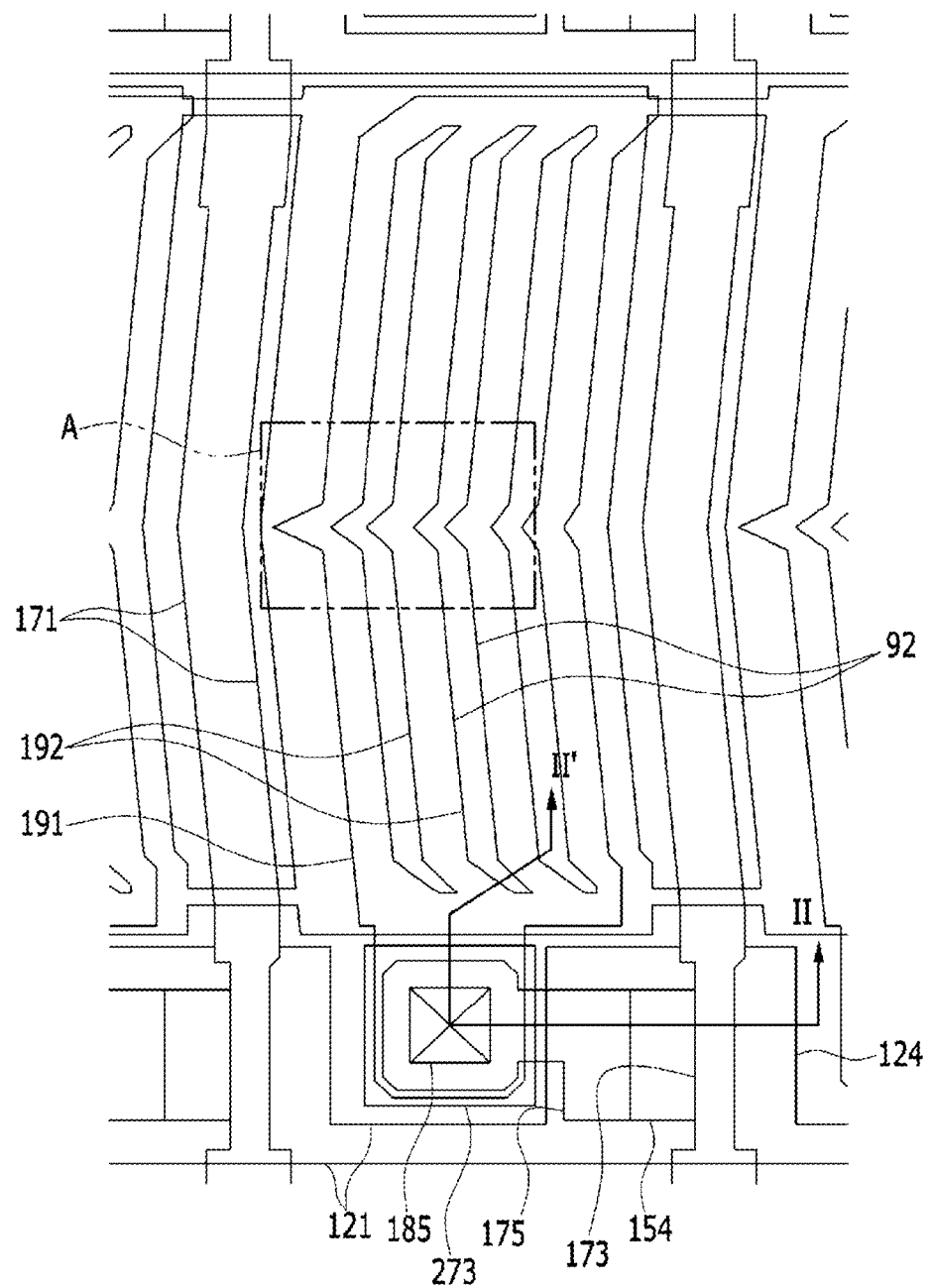
FIG. 1 is a layout view of a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 3:
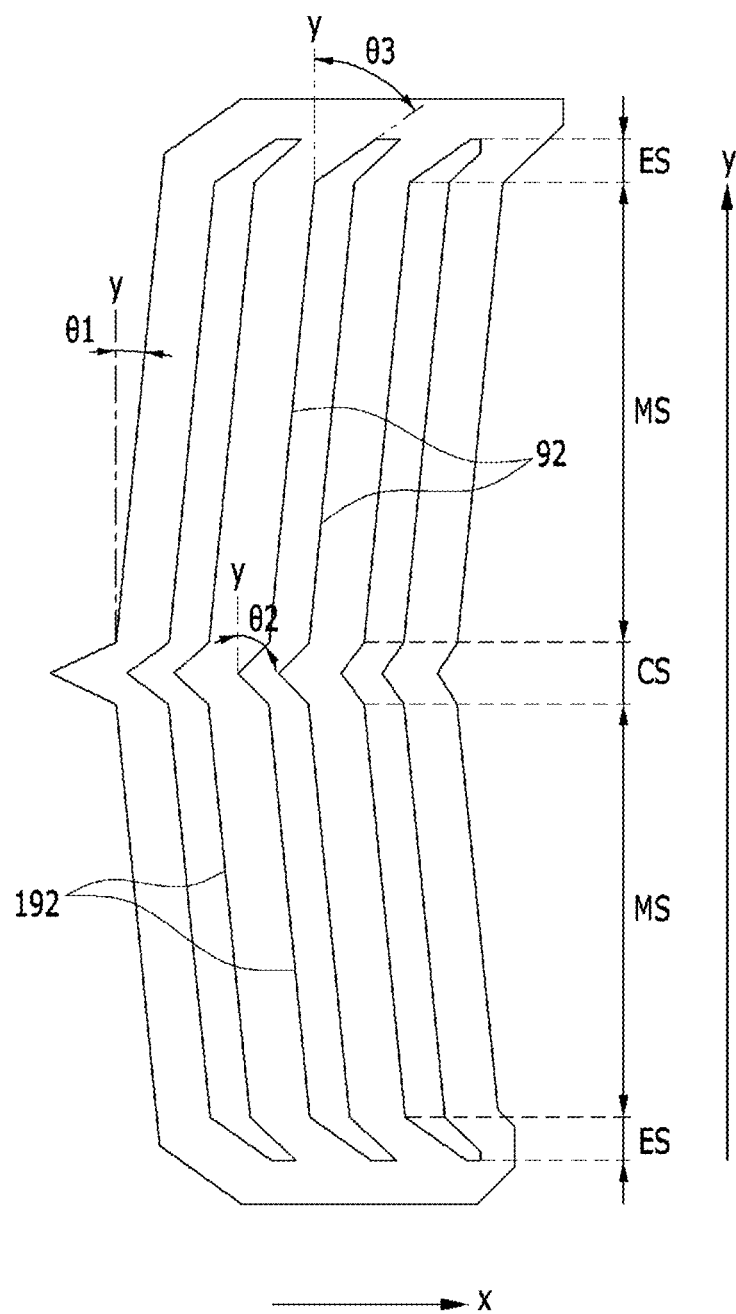
FIG. 3 is a drawing representing branch electrodes of the liquid crystal display according to the exemplary embodiment shown in FIG. 1.
Figure 4:
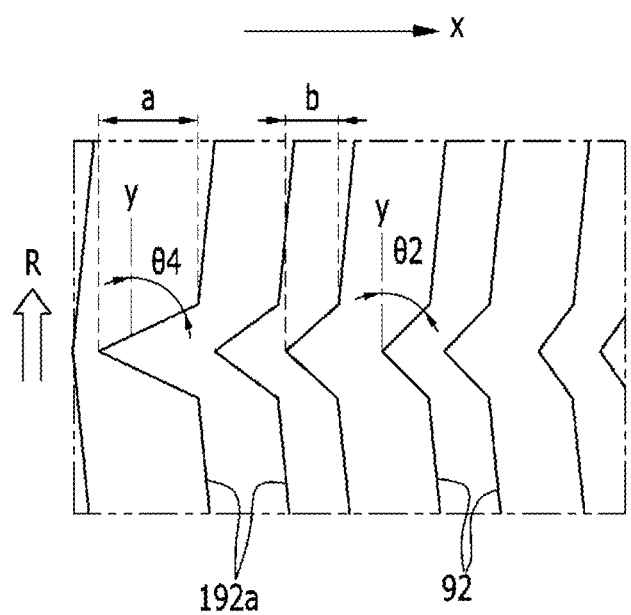
FIG. 4 is a drawing representing a portion of the liquid crystal display according to the exemplary embodiment shown in FIG. 1.

First, the liquid crystal display according to an exemplary embodiment of the present invention will be described with reference to FIG. 1 to FIG. 4. FIG. 1 is a layout view of a liquid crystal display according to an exemplary embodiment of the present invention, FIG. 2 is a cross-sectional view of the liquid crystal display according to the exemplary embodiment shown in FIG. 1, which is taken along line FIG. 3 is a drawing representing branch electrodes of the liquid crystal display according to the exemplary embodiment shown in FIG. 1, and FIG. 4 is a drawing representing a portion of the liquid crystal display according to the exemplary embodiment shown in FIG. 1.

Figure 2:
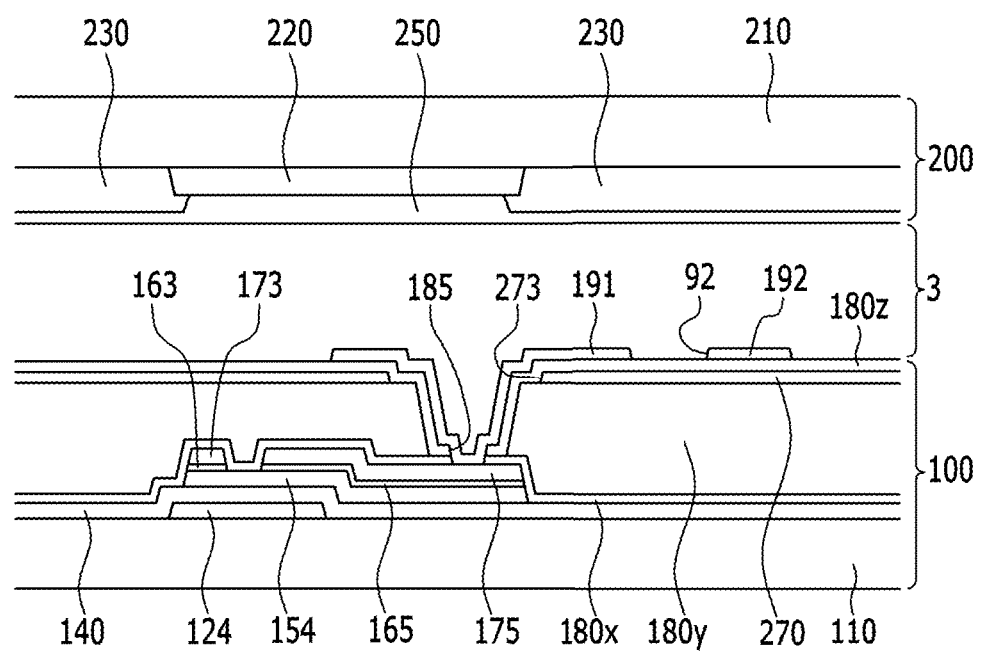
FIG. 2 is a cross-sectional view of the liquid crystal display according to the exemplary embodiment shown in FIG. 1 taken along line II-II'.

Referring to FIGS. 1 and 2, the liquid crystal display according to the exemplary embodiment of the present invention includes a lower display panel 100 and an upper display panel 200 that face each other, and a liquid crystal layer 3 injected therebetween. One pixel area is described as an example below.

First, the lower display panel 100 will be described.

A gate conductor including a gate line 121 is formed on an insulating substrate 110 formed of transparent glass, plastics, or the like.

The gate line 121 includes a gate electrode 124, and a wide end portion (not shown) for connection with another layer or an external driving circuit. The gate line 121 may be made of an aluminum-based metal such as aluminum (Al) or an aluminum alloy, a silver-based metal such as silver (Ag)

or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 formed of a silicon nitride ($SiN_x$), a silicon oxide ($SiO_x$), or the like is formed on the gate line 121. However, the gate insulating layer 140 may have a multilayered structure including at least two insulating layers having different physical properties.

A semiconductor 154 made of amorphous silicon, polysilicon, or the like is formed on the gate insulating layer 140. The semiconductor 154 may include an oxide semiconductor.

Ohmic contacts 163 and 165 are formed on the semiconductor 154. The ohmic contacts 163 and 165 may made of a material such as n+ hydrogenated amorphous silicon, in which an n-type impurity, such as phosphorus, is doped at a high concentration, or a silicide. The pair of ohmic contacts 163 and 165 may be disposed on the semiconductor 154. In the case where the semiconductor 154 is the oxide semiconductor, the ohmic contacts 163 and 165 may be omitted.

A data conductor including a data line 171, a source electrode 173, and a drain electrode 175 is formed on the ohmic contacts 163 and 165 and the gate insulating layer 140.

The data line 171 includes a wide end portion (not shown) for connection with another layer or an external driving circuit. The data line 171 transports a data signal and mainly extends in a vertical direction to cross the gate line 121.

In this case, the data line 171 may have a first bent portion having a bent shape in order to obtain maximum transmittance of the liquid crystal display, and bent portions may meet each other in a middle region of the pixel region to form a V shape. A second bent portion that is bent so as to form a predetermined angle with the first bent portion may be further included in the middle region of the pixel region.

The source electrode 173 is a portion of the data line 171, and is disposed on the same line as the data line 171. The drain electrode 175 is formed so as to extend in parallel with the source electrode 173. Accordingly, the drain electrode 175 is parallel to a portion of the data line 171.

The gate electrode 124, the source electrode 173, and the drain electrode 175 form a thin film transistor (TFT) in conjunction with the semiconductor 154, and a channel of the thin film transistor is formed in the semiconductor 154 between the source electrode 173 and drain electrode 175.

The liquid crystal display may include the source electrode 173 positioned on the same line as the data line 171 and the drain electrode 175 extending parallel to the data line 171 to increase a width of the thin film transistor without increasing the area of the data conductor, thus increasing an opening ratio of the liquid crystal display.

The data line 171 and the drain electrode 175 be made of a refractory metal, such as molybdenum, chromium, tantalum, and titanium, or an alloy thereof, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be made of other various metals or conductors in addition to this.

A first passivation layer 180x is disposed on the data conductors 171, 173, and 175, the gate insulating layer 140, and an exposed portion of the semiconductor 154. The first passivation layer 180x may be formed of an organic insulating material, an inorganic insulating material, or the like.

A second passivation layer 180y is disposed on the first passivation layer 180x. The second passivation layer 180y may be omitted. The second passivation layer 180y may be a color filter. In the case where the second passivation layer 180y is the color filter, the second passivation layer 180y may intrinsically display any one of primary colors, and examples of the primary colors may include three primary colors, such as red, green, and blue, yellow, cyan, and magenta, or the like. Although not shown in the drawings, the color filter may further include a color filter displaying a mixed color of the primary colors or white in addition to the primary colors.

A common electrode 270 is formed on the second passivation layer 180y. The common electrode 270 may have a planar shape and may be formed on the entire surface of the substrate 110 to have a whole plate shape, and may have an opening 273 disposed in a region corresponding to the circumference of the drain electrode 175. That is, the common electrode 270 may have a flat planar shape.

Common electrodes 270 disposed in adjacent pixels may be connected to each other to receive a predetermined common voltage supplied from the outside of the display region.

A third passivation layer 180z is disposed on the common electrode 270. The third passivation layer 180z may be formed of an organic insulating material, an inorganic insulating material, or the like.

A pixel electrode 191 is formed on the third passivation layer 180z. The pixel electrode 191 includes a curved edge that is almost parallel to the bent portion of the data line 171. The pixel electrode 191 has a plurality of first cutouts 92, and includes a plurality of first branch electrodes 192 defined by a plurality of first cutouts 92.

Referring to FIG. 3, each of the first branch electrodes 192 of the pixel electrode 191 includes a main branch portion (MS) forming a first angle $\theta 1$ with a vertical reference line (a reference line extending in a y direction) forming an angle of 90° with an extension direction (x direction) of the gate line 121, a center portion (CS) forming a second angle $\theta 2$ with the vertical reference line, and an edge portion (ES) forming a third angle $\theta 3$ with the vertical reference line. The second angle $\theta 2$ and the third angle $\theta 3$ may be greater than the first angle $\theta 1$.

Referring to FIG. 1 and FIG. 2, a first contact hole 185 exposing the drain electrode 175 is formed in the first passivation layer 180x, the second passivation layer 180y, and the third passivation layer 180z. The pixel electrode 191 is physically and electrically connected to the drain electrode 175 through the first contact hole 185 to receive a voltage from the drain electrode 175.

Although not shown in the drawings, an alignment layer may be formed on the pixel electrode 191 and the third passivation layer 180z The alignment layer may be arranged horizontally, and may be rubbed in a predetermined direction. However, in the liquid crystal display according to another exemplary embodiment of the present invention, the alignment layer may include a photoreactive material for alignment by light.

The upper display panel 200 will now be described.

A light blocking member 220 is formed on an insulating substrate 210 made of transparent glass, plastic, or the like. The light blocking member 220 is also called a black matrix and prevents light leakage.

A plurality of color filters 230 are formed on the substrate 210. In the case where the second passivation layer 180y of the lower display panel 100 is a color filter, the color filter 230 of the upper display panel 200 may be omitted. Further, the light blocking member 220 of the upper display panel 200 may be formed in the lower display panel 100.

An overcoat 250 is formed on the color filter 230 and the light blocking member 220. The overcoat 250 is made of an (organic) insulator, prevents exposure of the color filter 230, and provides a flat surface. The overcoat 250 may be omitted.

The alignment layer may be disposed on the overcoat 250.

The liquid crystal layer 3 includes a liquid crystal material having positive dielectric anisotropy. Liquid crystal molecules of the liquid crystal layer 3 are arranged so that a long axis direction thereof is parallel to the display panels 100 and 200.

The liquid crystal molecules of the liquid crystal layer 3 disposed on the two electrodes 191 and 270 are rotated in a direction that is parallel to a direction of an electric field by generating the electric field by the pixel electrode 191 and the common electrode 270 that are the field generating electrodes. As described above, according to the determined rotation direction of the liquid crystal molecules, the polarization of light passing through the liquid crystal layer is changed.

Now, shapes of branch electrodes of the liquid crystal display (LCD) according to an exemplary embodiment of the present invention will be described with reference to FIG. 3 and FIG. 4.

Referring to FIG. 3, the first branch electrodes 192 of the pixel electrode 191 includes a main branch portion (MS) forming a first angle θ1 with the vertical reference line (reference line extending in a y direction) forming an angle of 90° with the extension direction (x direction) of the gate line 121, a center portion (CS) forming a second angle θ2 with the vertical reference line, and an edge portion (ES) forming a third angle θ3 with the vertical reference line. The second angle θ2 and the third angle θ3 may be greater than the first angle θ1.

Referring to FIG. 4, the first branch electrodes 192 of the pixel electrode 191 include a first outermost branch electrode 192a disposed adjacent to data line 171 and including a protrusion protruding toward the data line 171. The outermost branch electrode described below is the branch electrode disposed adjacent to the data line 171 and including a protrusion protruding toward the data line 171.

As described above, the liquid crystal molecules of the liquid crystal display (LCD) according to an exemplary embodiment of the present invention are aligned to have pretilt angles in an alignment direction R substantially parallel to the vertical reference line (reference line extending in a y direction) forming an angle of 90° with the extension direction (x direction) of the gate line 121.

The center portions CS of the other first branch electrodes 192 of the pixel electrode 191 form the second angle θ2 with the alignment direction R, and the center portion CS of the first outermost branch electrode 192a of the pixel electrode 191 forms a fourth angle θ4 greater than the second angle θ2 with the alignment direction R. More specifically, the center portion CS of the first outermost branch electrode 192a of the pixel electrode 191 is bent to have an angle of about 45° or less with the extension direction (x direction) of the gate line 121. On the other hand, the center portions CS of the other first branch electrodes 192 of the pixel electrode 191 than the first outermost branch electrode 192a is bent to have an angle of about 45° or greater with the extension direction (x direction) of the gate line 121. In addition, a first distance (a) between the center portion CS of the first outermost branch electrode 192a and the main branch portion MS of the first outermost branch electrode 192a is greater than a second distance (b) between the center portion CS of the other first branch electrodes 192 and the main branch portion MS of the other first branch electrodes 192. The first distance (a) and the second distance (b) are measured in a direction parallel to the extension direction (x direction) of the gate line 121. Accordingly, the center portion CS of the first outermost branch electrode 192a is protruded more than the center portions CS of the other first branch electrodes 192 toward the edge of the pixel area. More specifically, the first distance (a) between the center portion CS of the first outermost branch electrode 192a and the main branch portion MS of the first outermost branch electrode 192a is greater than the second distance (b) between the center portion CS of the other first branch electrodes 192 and the main branch portion MS of the other first branch electrodes 192 by about 1 μm to about 2 μm.

In this way, the center portion CS of the first outermost branch electrode 192a is bent to have a smaller angle and to be protruded more than the center portions CS of the other first branch electrodes 192 toward the edge of the pixel area based on the extension direction (x direction) of the gate line 121.

Figure 5A:
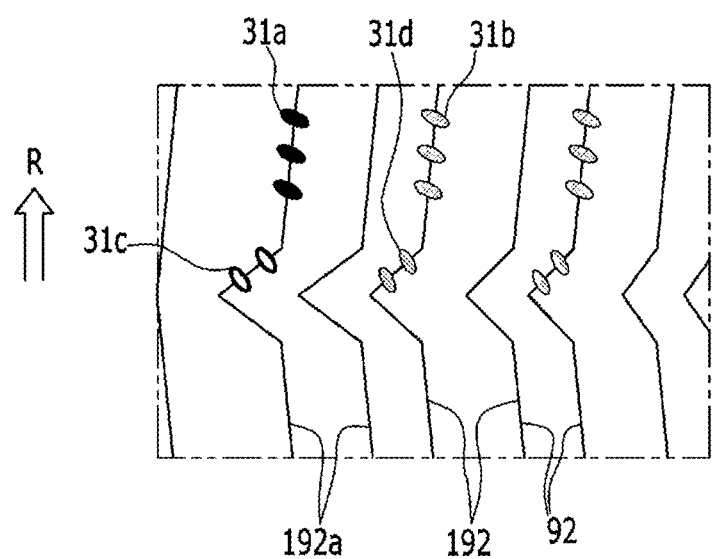
FIG. 5A and FIG. 5B are drawings representing behavior of liquid crystal molecules adjacent to branch electrodes of the liquid crystal display according to an exemplary embodiment.
Figure 5B:
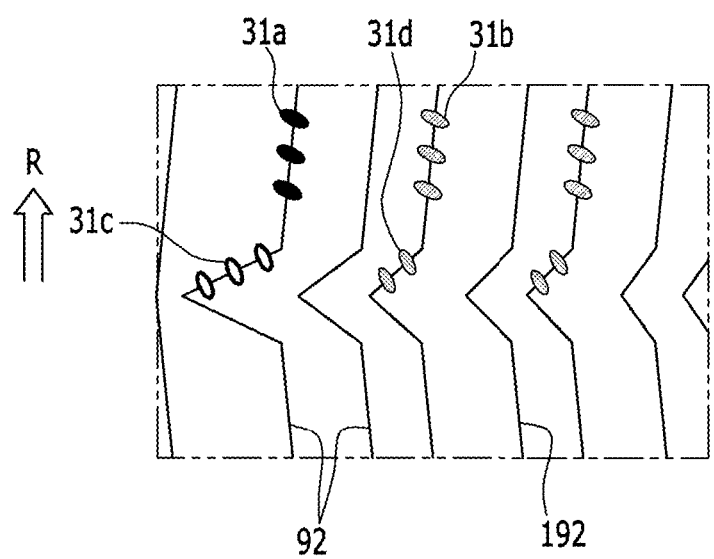

With reference to FIG. 5A and FIG. 5B, behaviors of liquid crystal molecules of the known liquid crystal display and the liquid crystal displays according to the exemplary embodiment will be described. FIG. 5A and FIG. 5B are drawings representing behavior of liquid crystal molecules adjacent to branch electrodes of the liquid crystal display according to the exemplary embodiment. FIG. 5A represents behavior of liquid crystal molecules adjacent to branch electrodes of the known liquid crystal display, and FIG. 5B represents behavior of liquid crystal molecules adjacent to branch electrodes of the liquid crystal display (LCD) according to an exemplary embodiment of the present invention.

Referring to FIG. 5A, the center portions of the branch electrodes 192 of the pixel electrode 191 have constant angles with the alignment direction R in the known liquid crystal display.

The liquid crystal molecules are rotated in a direction that is substantially perpendicular to edges of the branch electrodes 192 by supplying voltages to the pixel electrode 191 and the common electrode 270.

As shown in FIG. 5A, first liquid crystal molecules 31a disposed adjacent to the main branch portion MS of the first outermost branch electrode 192a are rotated to have a larger angle with the alignment direction R than second liquid crystal molecules 31b disposed adjacent to the main branch portion (MS) of the first branch electrodes 192 disposed inside of the pixel area. The second liquid crystal molecules 31b disposed adjacent to the first branch electrodes 192 disposed inside of the pixel area are affected by the electric fields generated by other first branch electrodes 192 adjacent to each other, and accordingly, the second liquid crystal molecules 31b are rotated to have a decreasing angle from the alignment direction R as compared with the first liquid crystal molecules 31a disposed adjacent to the first outermost branch electrode 192a. Similarly, third liquid crystal molecules 31c disposed adjacent to the center portion CS of the first outermost branch electrode 192a are rotated to have a larger angle with the alignment direction R than fourth liquid crystal molecules 31*d* disposed adjacent to the center portion CS of the first branch electrodes 192 disposed inside of the pixel area.

In addition, the center portions CS of branch electrodes have a larger angle with the alignment direction R than the main branch portions MS of the branch electrodes, and accordingly, the first liquid crystal molecules 31*a* are rotated to have a larger angle with the alignment direction R than the third liquid crystal molecules 31*c* and the second liquid crystal molecules 31*b* are rotated to have a larger angle with the alignment direction R than the fourth liquid crystal molecules 31*d*. Therefore, with reference to the alignment direction R, rotation angles of the first liquid crystal molecules 31*a* are the largest, the rotation angles of the second liquid crystal molecules 31*b* are less than the rotation angles of the first liquid crystal molecules 31*a* and larger than the rotation angles of the third liquid crystal molecules 31*c*, and the rotation angles of the fourth liquid crystal molecules 31*d* are smallest. The first liquid crystal molecules 31*a*, the second liquid crystal molecules 31*b*, the third liquid crystal molecules 31*c*, and the fourth liquid crystal molecules 31*d* are rotated to have sequentially increasing angles with the alignment direction R.

When the voltages supplied to the pixel electrode 191 and the common electrode 270 are turned off, the liquid crystal molecules are rotated toward the initial alignment directions parallel to the alignment direction R to be returned to an initial arrangement state.

Here, the third liquid crystal molecules 31*c* disposed adjacent to the center portion CS of the first outermost branch electrode 192*a* that have rotated to have the largest angle with the alignment direction R are more difficult to rearrange toward the initial alignment directions parallel to the alignment direction R. Accordingly, irregular behavior of the liquid crystal molecules disposed adjacent to the center portion CS of the first outermost branch electrode 192*a* occur and, as a result, deteriorated transmittance of the liquid crystal display is caused by this irregular behavior of the liquid crystal molecules adjacent to the center portion CS of the first outermost branch electrode 192*a*.

Referring to FIG. 5B, according to the liquid crystal display (LCD) according to an exemplary embodiment of the present invention, the center portion CS of the first outermost branch electrode 192*a* has a larger angle than the center portion CS of the first branch electrodes 192 disposed inside of the pixel area with the alignment direction R.

As described above, the liquid crystal molecules of the liquid crystal display (LCD) are rotated toward the direction perpendicular to edges of the first branch electrodes 192 by supplying voltages to the pixel electrode 191 and the common electrode 270.

According to the liquid crystal display (LCD) according to the present embodiment of the present invention, the third liquid crystal molecules 31*c* disposed adjacent to the center portion CS of the first outermost branch electrode 192*a* are rotated to have a smaller angle with the alignment direction R than the fourth liquid crystal molecules 31*d* disposed adjacent to the center portion CS of the first branch electrodes 192 disposed inside of the pixel area.

The liquid crystal molecules are rotated toward the initial alignment directions parallel to the alignment direction R, and are returned to an initial arrangement state after the voltages supplied to the pixel electrode 191 and the common electrode 270 are turned off. Here, the third liquid crystal molecules 31*c* disposed adjacent to the center portion CS of the first outermost branch electrode 192*a* that have rotated to have the smaller angle with the alignment direction R are rearranged toward the initial alignment directions parallel to the alignment direction R faster than the fourth liquid crystal molecules 31*d*.

In this way, according to the liquid crystal display (LCD) according to an exemplary embodiment of the present invention, the irregular behavior of the liquid crystal molecule disposed adjacent to the center portion CS of the first outermost branch electrode 192*a* occurring in the known liquid crystal display (LCD) can be prevented, and therefore, the reduction of the transmittance of the liquid crystal display generated by this irregular behavior of the liquid crystal molecules adjacent to the center portion CS of the first outermost branch electrode 192*a* can be prevented.

Figure 6:
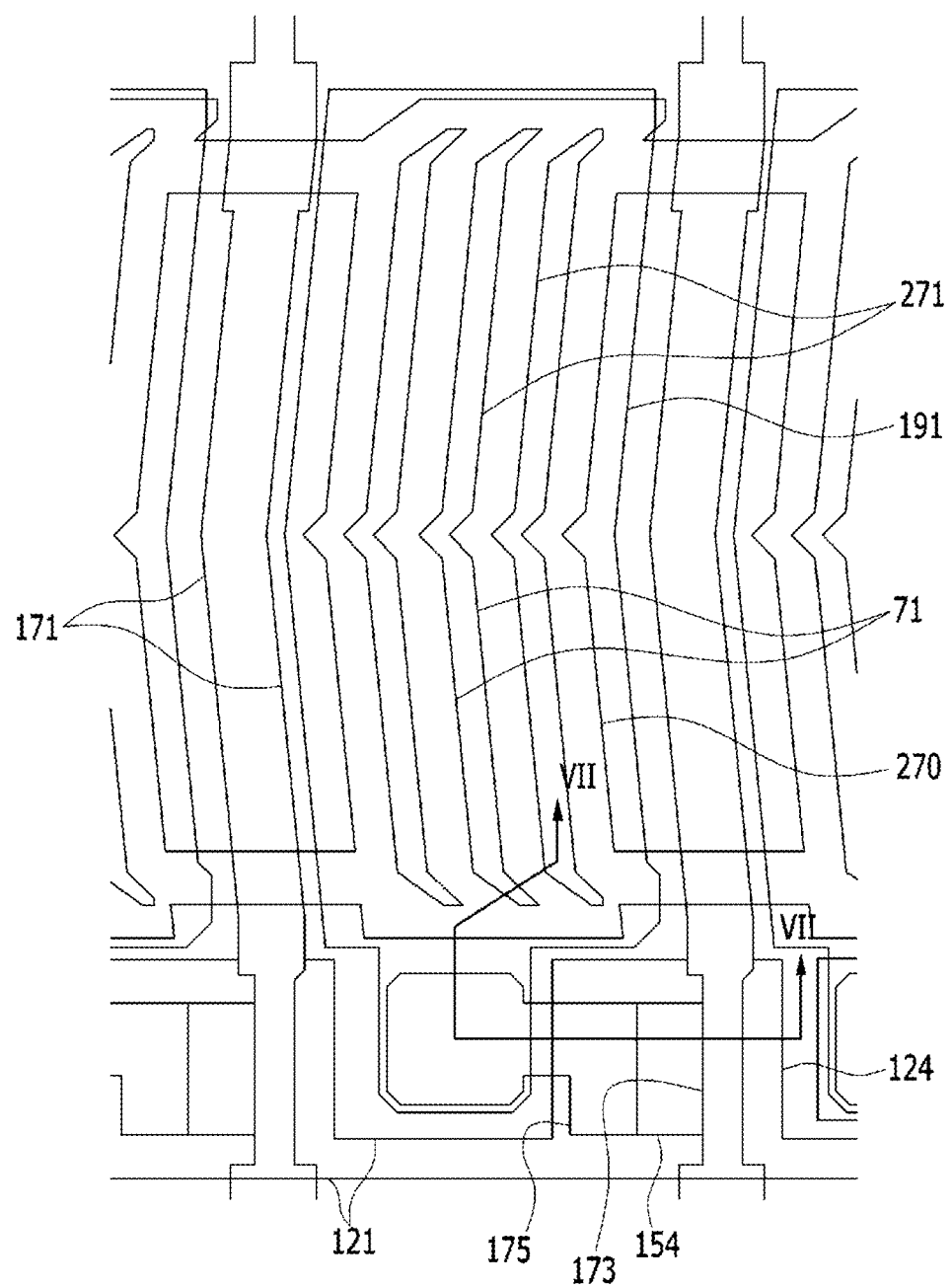
FIG. 6 is a layout view of a liquid crystal display according to another exemplary embodiment of the present invention.
Figure 8:
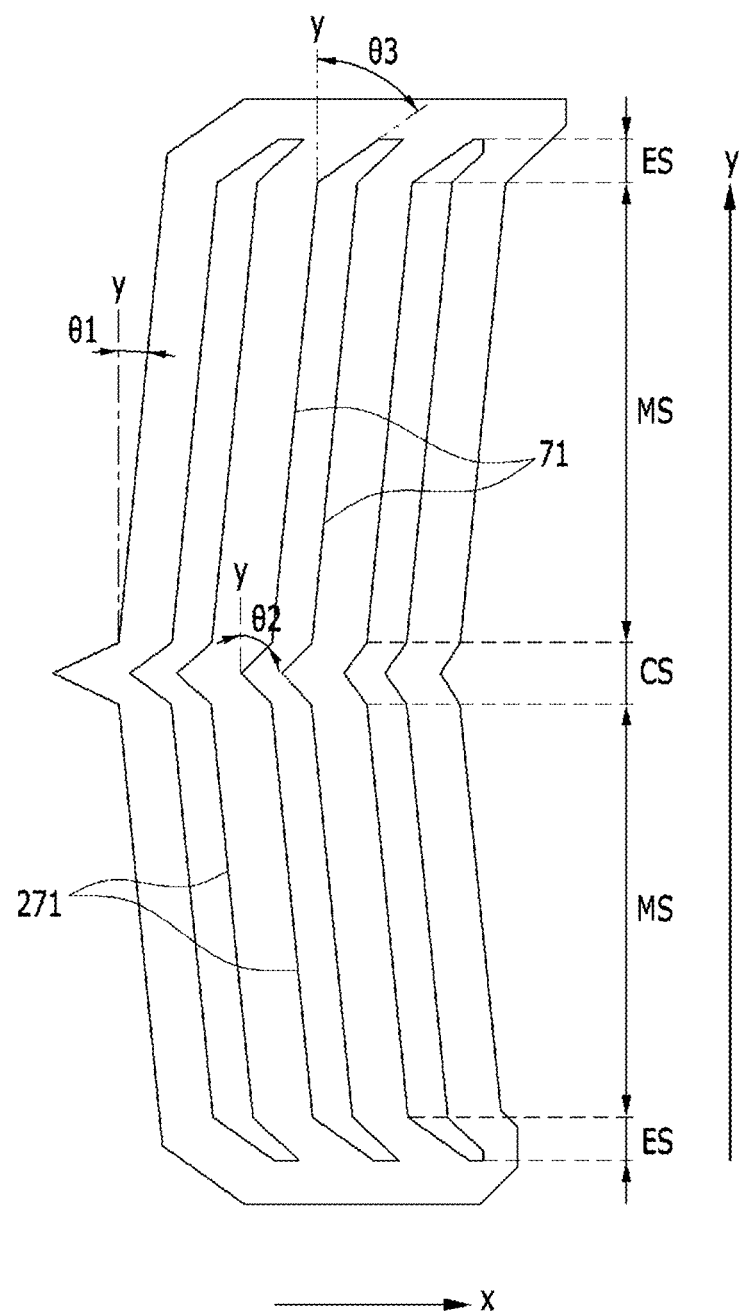
FIG. 8 is a drawing representing branch electrodes of the liquid crystal display according to the exemplary embodiment shown in FIG. 6.
Figure 9:
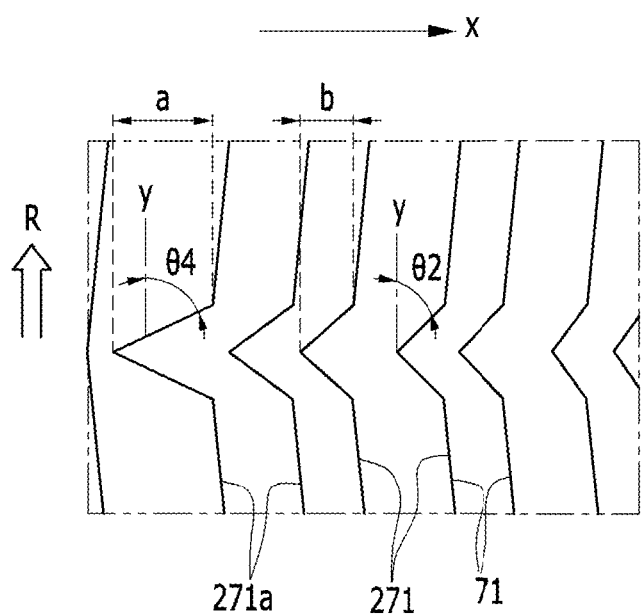
FIG. 9 is a drawing representing a portion of the liquid crystal display according to the exemplary embodiment shown in FIG. 6.

Now, the liquid crystal display according to another exemplary embodiment of the present invention will be described with reference to FIG. 6 to FIG. 9. FIG. 6 is a layout view of a liquid crystal display according to another exemplary embodiment of the present invention, FIG. 7 is a cross-sectional view of the liquid crystal display according to the exemplary embodiment shown in FIG. 6, which is taken along line VII-VII, FIG. 8 is a drawing representing branch electrodes of the liquid crystal display according to the exemplary embodiment shown in FIG. 6, and FIG. 9 is a drawing representing a portion of the liquid crystal display according to the exemplary embodiment shown in FIG. 6.

Figure 7:
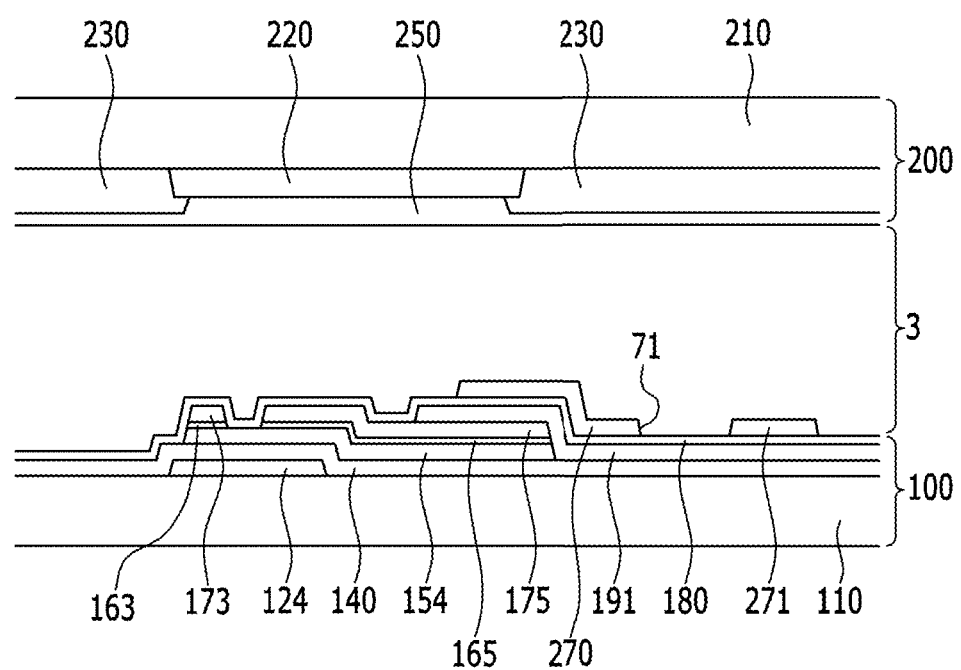
FIG. 7 is a cross-sectional view of the liquid crystal display according to the exemplary embodiment shown in FIG. 6 taken along line VII-VII.

Referring to FIG. 6 and FIG. 7, the liquid crystal display according to the present exemplary embodiment is similar to the liquid crystal display according to the exemplary embodiment shown in FIGS. 1 and 2.

The liquid crystal display according to the exemplary embodiment of the present invention includes the lower display panel 100 and the upper display panel 200 facing each other, and the liquid crystal layer 3 injected therebetween.

First, the lower display panel 100 will be described.

The gate conductor including the gate line 121 is formed on the insulating substrate 110.

The gate insulating layer 140 formed of a silicon nitride ($SiN_x$), a silicon oxide ($SiO_x$), or the like is formed on the gate conductor 121.

The semiconductor 154 is formed on the gate insulating layer 140.

The ohmic contacts 163 and 165 are formed on the semiconductor 154. In the case where the semiconductor 154 is the oxide semiconductor, the ohmic contacts 163 and 165 may be omitted.

The data conductor including the data line 171, the source electrode 173, and the drain electrode 175 is formed on the ohmic contacts 163 and 165 and the gate insulating layer 140.

The pixel electrode 191 is formed directly on the drain electrode 175. The pixel electrode 191 is disposed in one pixel region to have a plate shape.

A passivation layer 180 is disposed on the data conductors 171, 173, and 175, the gate insulating layer 140, the exposed portion of the semiconductor 154, and the pixel electrode 191. However, in the liquid crystal display according to the current exemplary embodiment of the present invention, the passivation layer 180 may be disposed between the pixel electrode 191 and the data line 171, and the pixel electrode 191 may be connected through a contact hole (not shown) formed in the passivation layer 180 to the drain electrode 175.

The common electrode 270 is formed on the passivation layer 180. The common electrode 270 receives the common voltage from the common voltage application portion disposed outside of the display region.

The common electrode 270 includes the curved edge that is almost parallel to the first bent portion and the second bent portion of the data line 171, and the common electrodes 270 disposed in the adjacent pixels are connected to each other.

The common electrode 270 has a plurality of second cutouts 71, and includes a plurality of second branch electrodes 271 defined by a plurality of second cutouts 71.

Referring to FIG. 8, the second cutouts 71 of the common electrode 270 includes the main branch portion (MS) forming the first angle θ1 with the vertical reference line (reference line extending in a y direction) forming an angle of 90° with the extension direction (x direction) of the gate line 121, the center portion (CS) forming the second angle θ2 with the vertical reference line, and the edge portion (ES) forming the third angle θ3 with the vertical reference line. The second angle θ2 and the third angle θ3 may be greater than the first angle θ1.

Although not shown in the drawings, the alignment layer may be applied horizontally on the common electrode 270 and the passivation layer 180 and may be rubbed in a predetermined direction. However, in the liquid crystal display according to another exemplary embodiment of the present invention, the alignment layer may include a photoreactive material for alignment by light.

Now, referring to FIG. 6 and FIG. 7, the upper display panel 200 will be described.

The light blocking member 220 is formed on the insulating substrate 210. A plurality of color filters 230 are formed on the substrate 210. In the case where the color filter 230 is disposed on the lower display panel 100, the light blocking member 220 may be disposed in the lower display panel 100.

The overcoat 250 is formed on the color filter 230 and the light blocking member 220. The overcoat 250 may be omitted.

The alignment layer may be disposed on the overcoat 250. The liquid crystal layer 3 includes a liquid crystal material having positive dielectric anisotropy. The liquid crystal molecules of the liquid crystal layer 3 are arranged so that a long axis direction thereof is parallel to the display panels 100 and 200.

The pixel electrode 191 receives a data voltage from the drain electrode 175, and the common electrode 270 receives a predetermined reference voltage from a reference voltage application portion disposed outside of the display region.

The liquid crystal molecules of the liquid crystal layer 3 positioned on the two electrodes 191 and 270 are rotated in a direction that is parallel to a direction of an electric field by generating the electric field by the pixel electrode 191 and the common electrode 270 that are the field generating electrodes. As described above, according to the determined rotation direction of the liquid crystal molecules, the polarization of light passing through the liquid crystal layer is changed.

Now, shapes of branch electrodes of the liquid crystal display (LCD) according to an exemplary embodiment of the present invention will be described with reference to FIG. 8 and FIG. 9.

Referring to FIG. 8, the second branch electrodes 271 of the common electrode 270 includes a main branch portion (MS) forming a first angle θ1 with the vertical reference line (reference line extending in a y direction) forming an angle of 90° with the extension direction (x direction) of the gate line 121, a center portion (CS) forming a second angle θ2 with the vertical reference line, and an edge portion (ES) forming a third angle θ3 with the vertical reference line. The second angle θ2 and the third angle θ3 may be greater than the first angle θ1.

Referring to FIG. 9, the second branch electrodes 271 of the common electrode 270 include a second outermost branch electrode 271a disposed adjacent to the data line 171, and include a protrusion protruding toward the data line 171.

As described above, the liquid crystal molecules of the liquid crystal display (LCD) according to an exemplary embodiment of the present invention are aligned to have pretilt angles in an alignment direction (R) substantially parallel to the vertical reference line (reference line extending in a y direction) forming an angle of 90° with the extension direction (x direction) of the gate line 121.

The center portions CS of the other second branch electrodes 271 of the common electrode 270 form the second angle θ2 with the alignment direction R, and the center portion CS of the second outermost branch electrode 271a of the common electrode forms a fourth angle θ4 greater than the second angle θ2 with the alignment direction R. More specifically, the center portion CS of the second outermost branch electrode 271a is bent to have an angle of about 45° or less with the extension direction (x direction) of the gate line 121. On the other hand, the center portions CS of the second branch electrodes 271 other than the second outermost branch electrode 271a are bent to have an angle of about 45° or greater with the extension direction (x direction) of the gate line 121.

In addition, a first distance (a) between the center portion CS of the second outermost branch electrode 271a and the main branch portion MS of the second outermost branch electrode 271a is greater than a second distance (b) between the center portion CS of the other second branch electrodes 271 and the main branch portion MS of the other second branch electrodes 271. The first distance (a) and the second distance (b) are measured in a direction parallel to the extension direction (x direction) of the gate line 121. Accordingly, the center portion (CS) of the second outermost branch electrode 271a protrudes more than the center portions (CS) of the other second branch electrodes 271 toward the edge of the pixel area. More specifically, the first distance (a) between the center portion CS of the second outermost branch electrode 271a and the main branch portion MS of the second outermost branch electrode 271a is larger than the second distance (b) between the center portion CS of the other second branch electrodes 271 and the main branch portion MS of the other second branch electrodes 271 by about 1 μm to about 2 μm.

In this way, the center portion CS of the second outermost branch electrode 271a is bent to have a larger angle and protrude more than the center portions CS of the other second branch electrodes 271 toward the edge of the pixel area based on the extension direction (x direction) of the gate line 121.

Similar to the liquid crystal display (LCD) according to the exemplary embodiment of the present invention described above, the liquid crystal molecules of the liquid crystal display (LCD) are rotated toward the direction perpendicular to edges of the second branch electrodes 271 by supplying voltages to the pixel electrode 191 and the common electrode 270.

According to the liquid crystal display (LCD) according to the present exemplary embodiment of the present invention, the liquid crystal molecules disposed adjacent to the center portion CS of the second outermost branch electrode 271a are rotated to have a smaller angle with the alignment direction R than the liquid crystal molecules disposed adjacent to the center portion CS of the second branch electrodes 271 disposed inside of the pixel area.

The liquid crystal molecules are rotated toward the initial alignment directions parallel to the alignment direction R to be returned to an initial arrangement state after the voltages supplied to the pixel electrode 191 and the common electrode 270 are turned off. Here, the liquid crystal molecules disposed adjacent to the center portion CS of the second outermost branch electrode 271a that have rotated to have the smaller angle with the alignment direction R are rearranged toward the initial alignment directions parallel to the alignment direction R faster than the liquid crystal molecules adjacent to the center portion CS of the second branch electrodes 271 disposed inside of the pixel area.

In this way, according to the liquid crystal display (LCD) according to an exemplary embodiment of the present invention, the irregular behavior of the liquid crystal molecules disposed adjacent to the center portion CS of the second outermost branch electrode 271a occurring in the known liquid crystal display (LCD) can be prevented, and therefore, the deterioration of the transmittance of the liquid crystal display can be prevented.

Figure 10A:
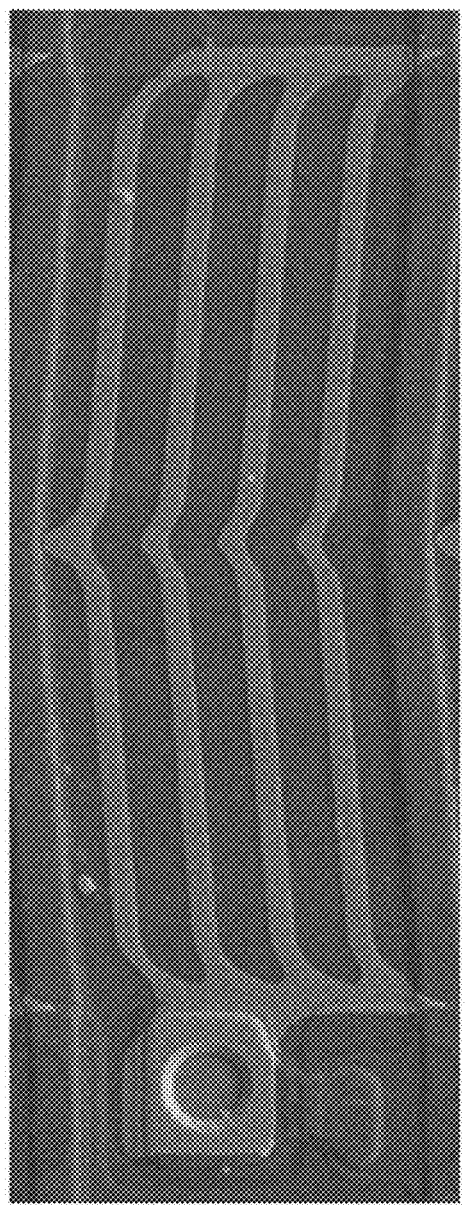
FIG. 10A and FIG. 10B are drawings showing shapes of branch electrodes of the liquid crystal display according to an experimental example of the present invention.
Figure 10B:
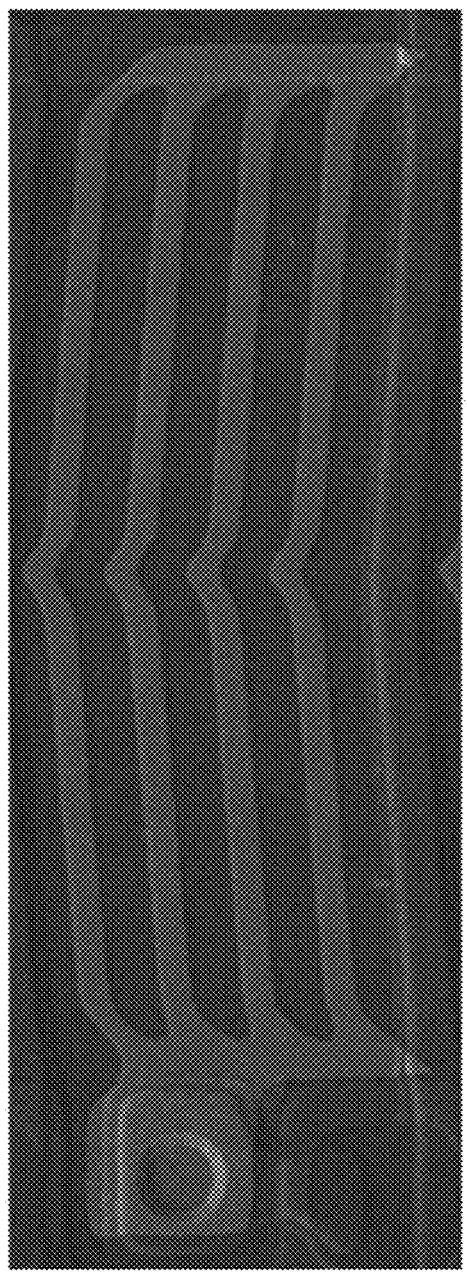
Figure 11A:
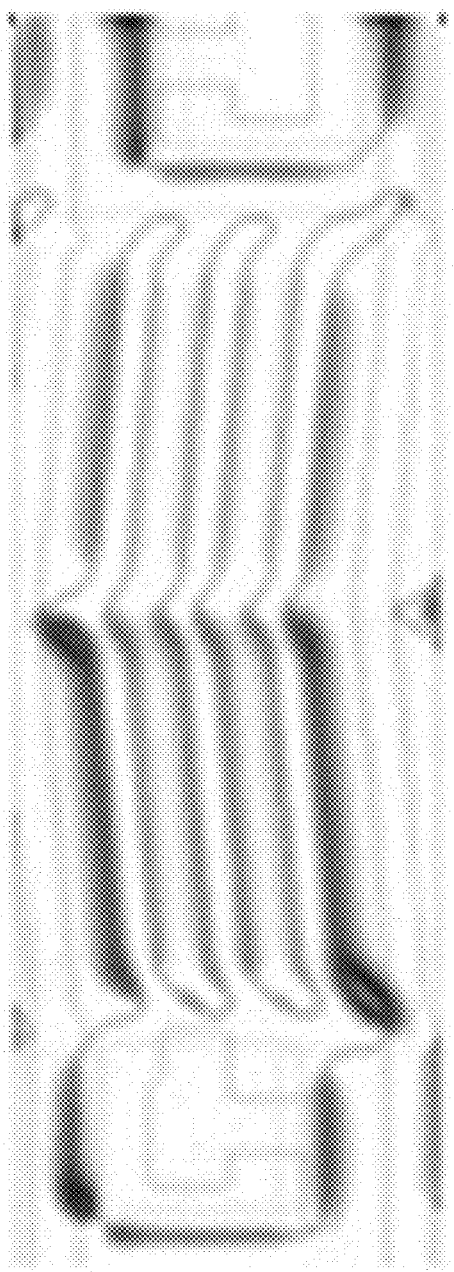
FIG. 11A, FIG. 11B, FIG. 11C, FIG. 11D, FIG. 11E, FIG. 11F, FIG. 11G, FIG. 11H, and FIG. 11I are drawings showing a result of transmittance of a portion of the liquid crystal display according to an experimental example of the present invention.
Figure 11B:
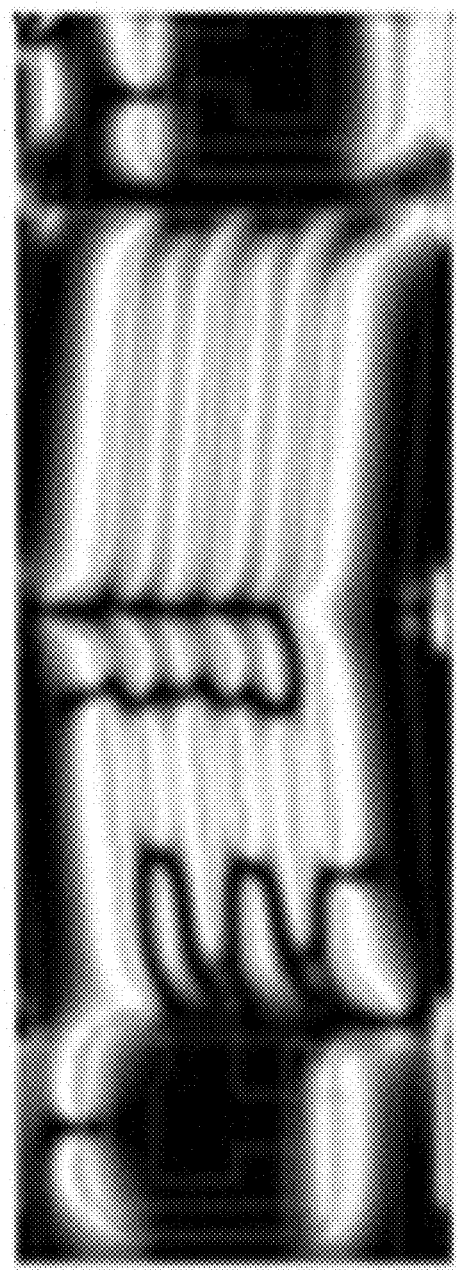
Figure 11C:
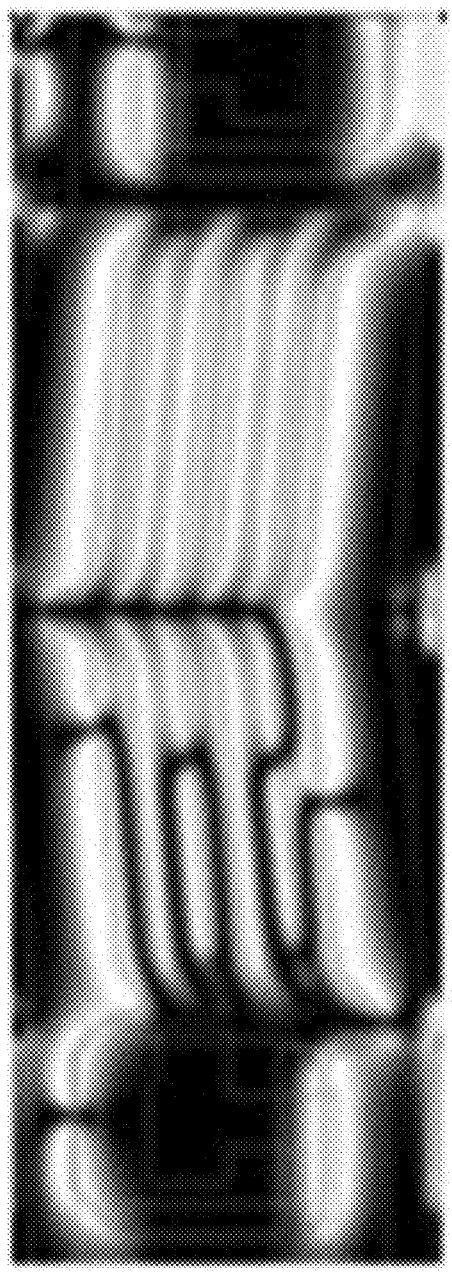
Figure 11D:
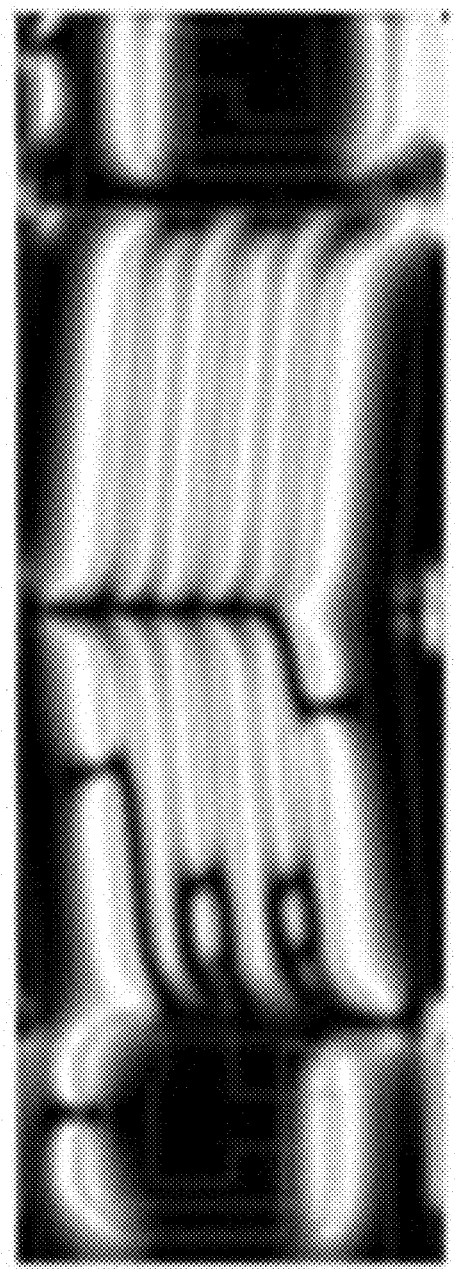
Figure 11E:
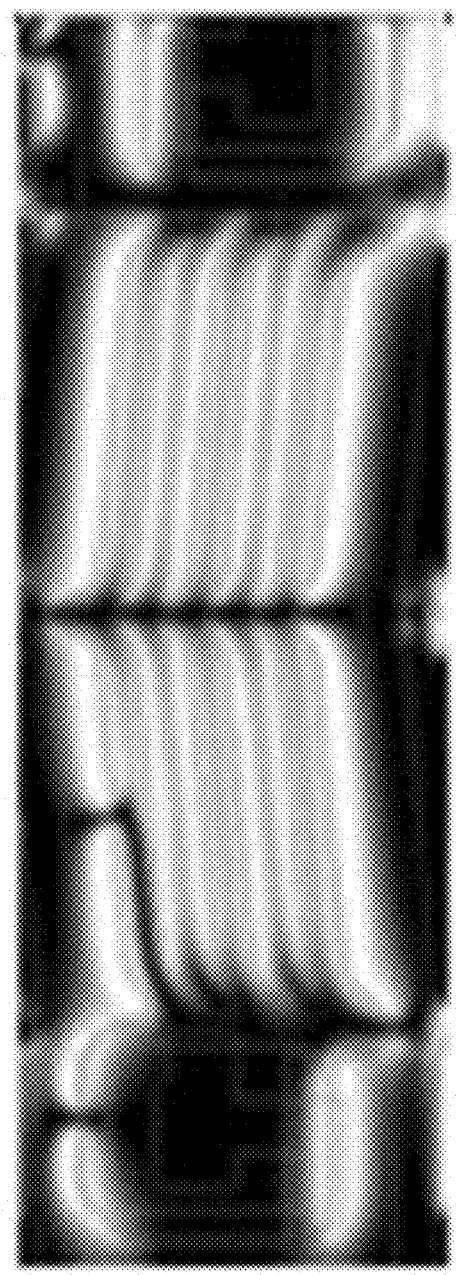
Figure 11F:
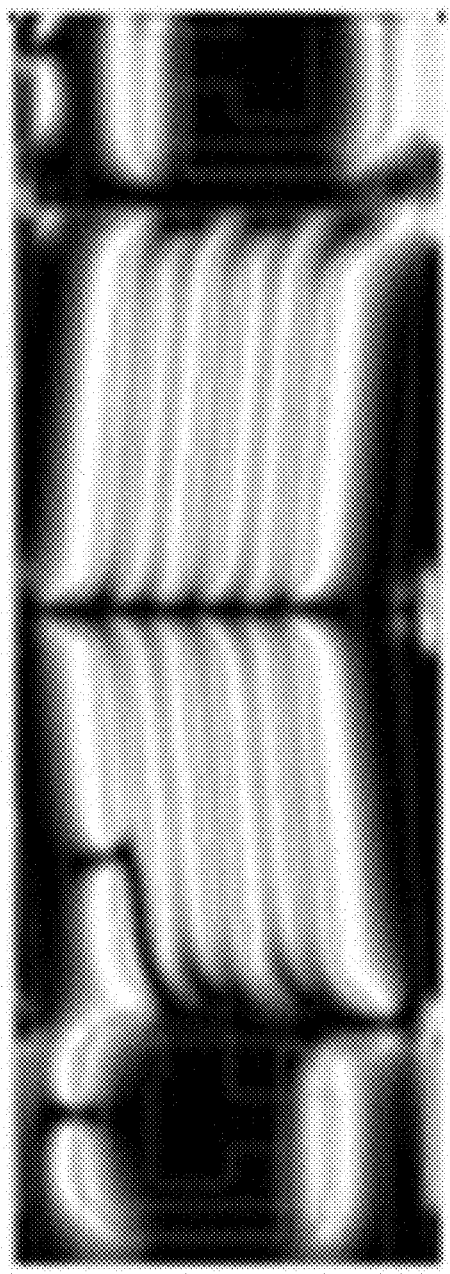
Figure 11G:
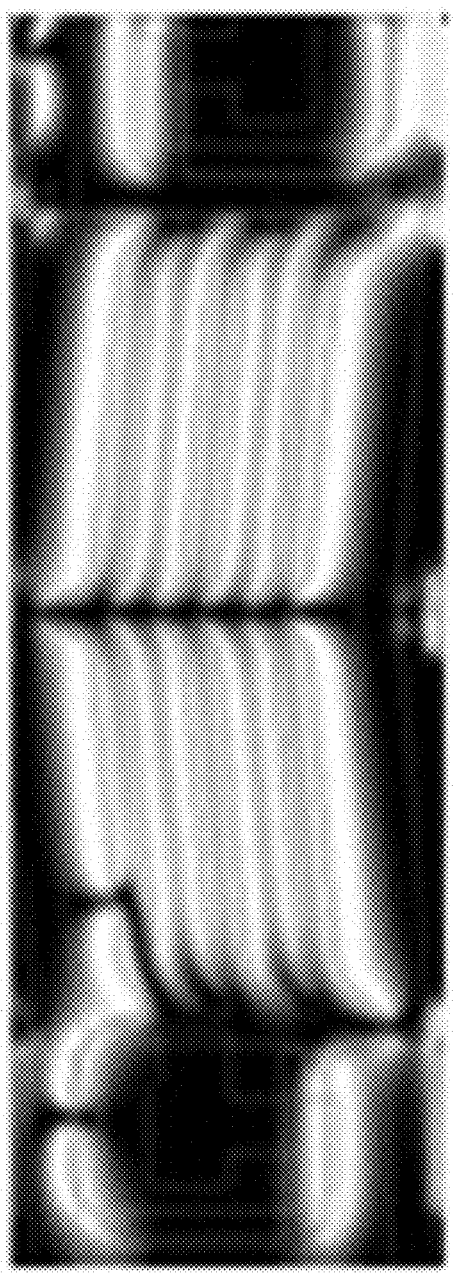
Figure 11H:
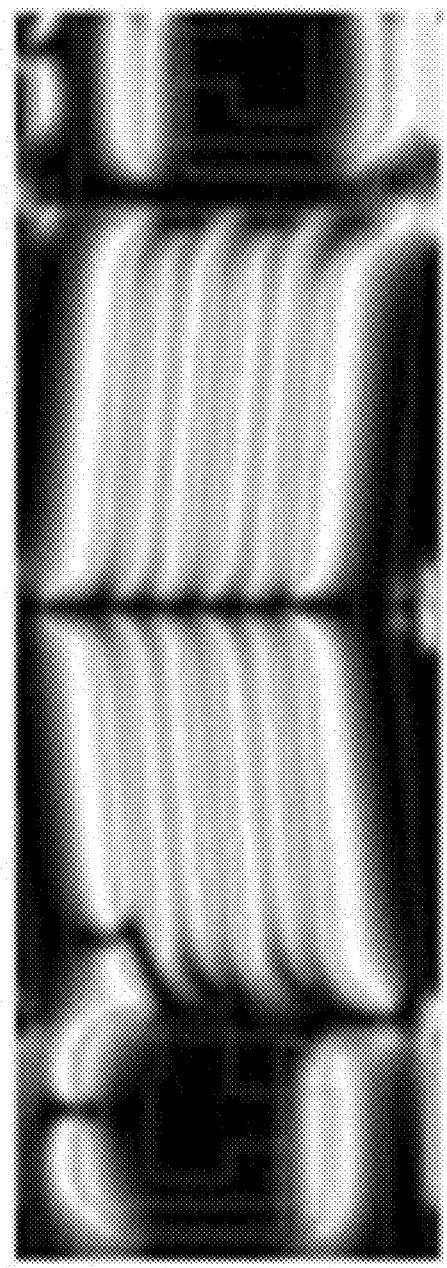
Figure 11I:
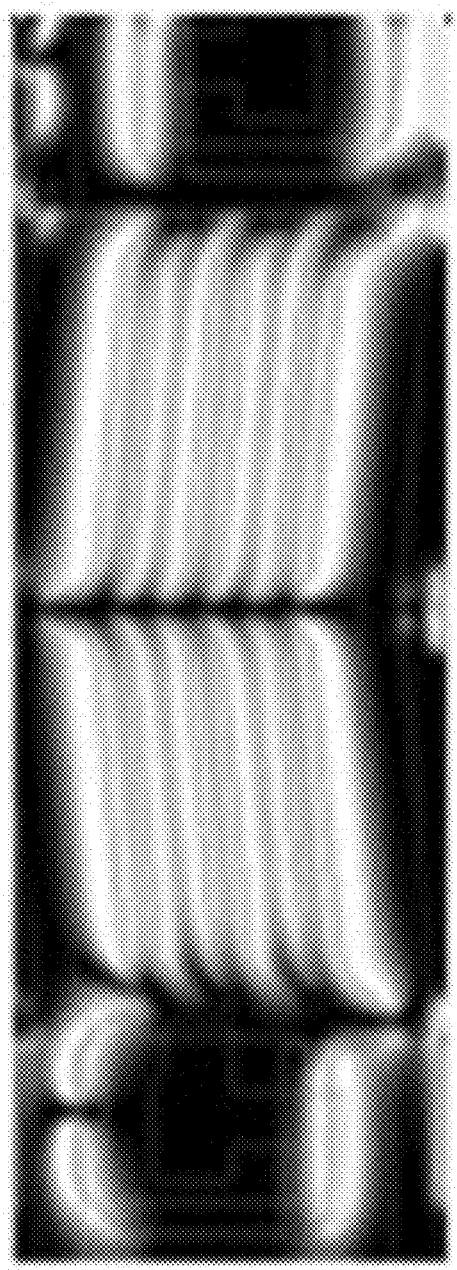
Figure 12A:
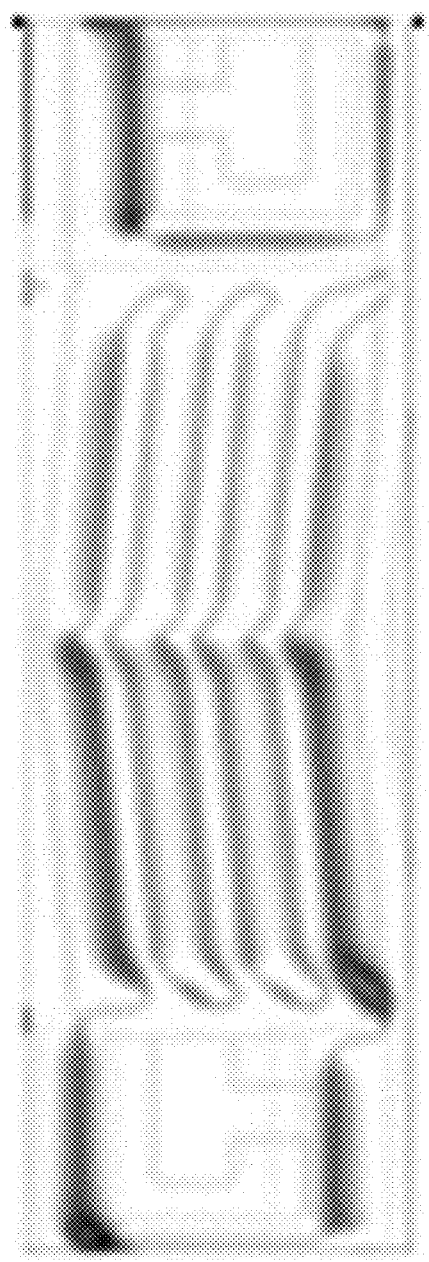
FIG. 12A, FIG. 12B, FIG. 12C, FIG. 12D, FIG. 12E, FIG. 12F, FIG. 12G, FIG. 12H, and FIG. 12I are drawings showing a result of transmittance of a portion of the liquid crystal display according to an experimental example of the present invention.
Figure 12B:
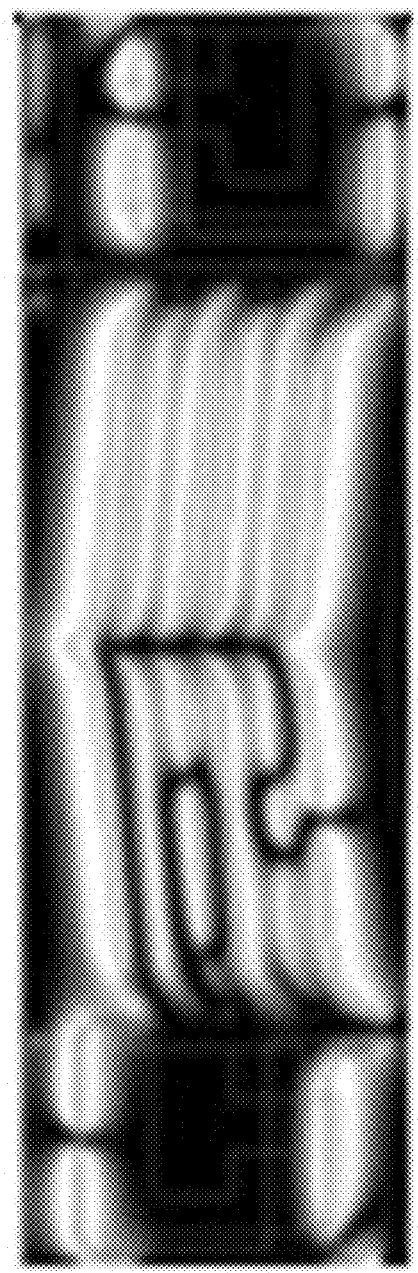
Figure 12C:
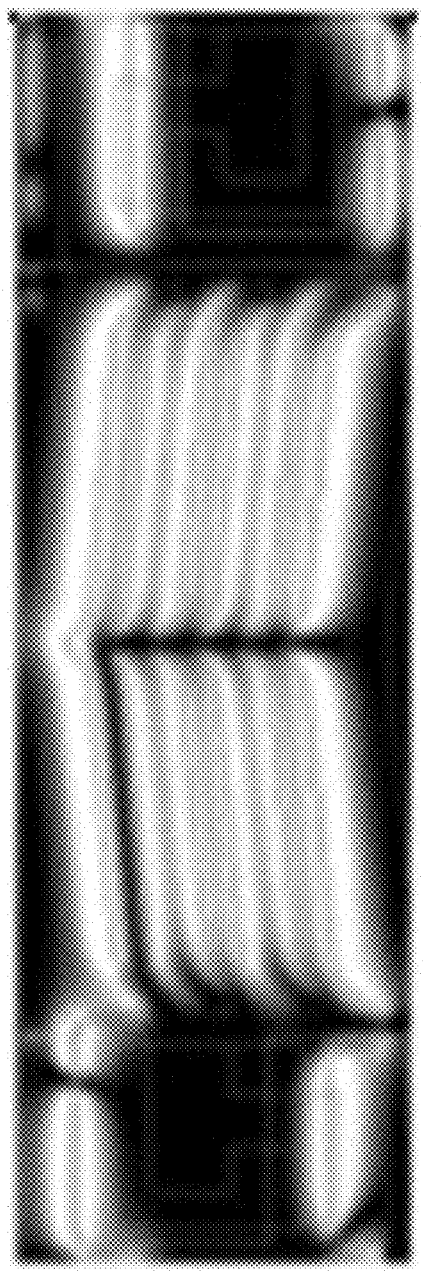
Figure 12D:
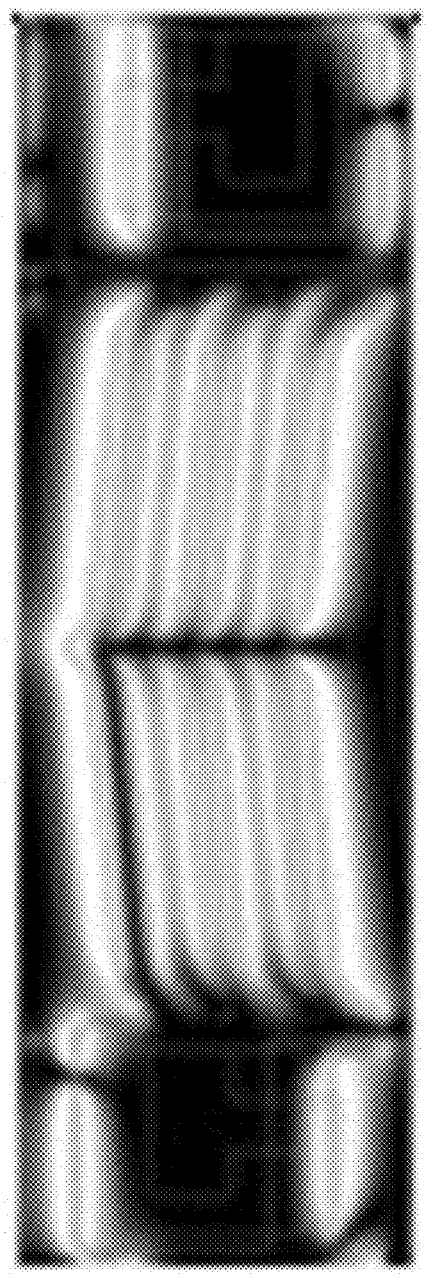
Figure 12E:
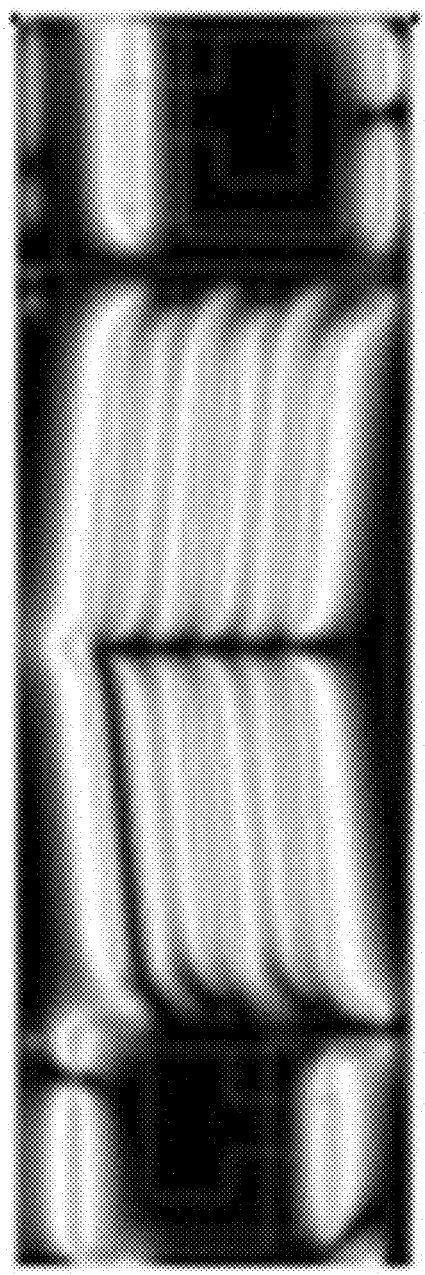
Figure 12F:
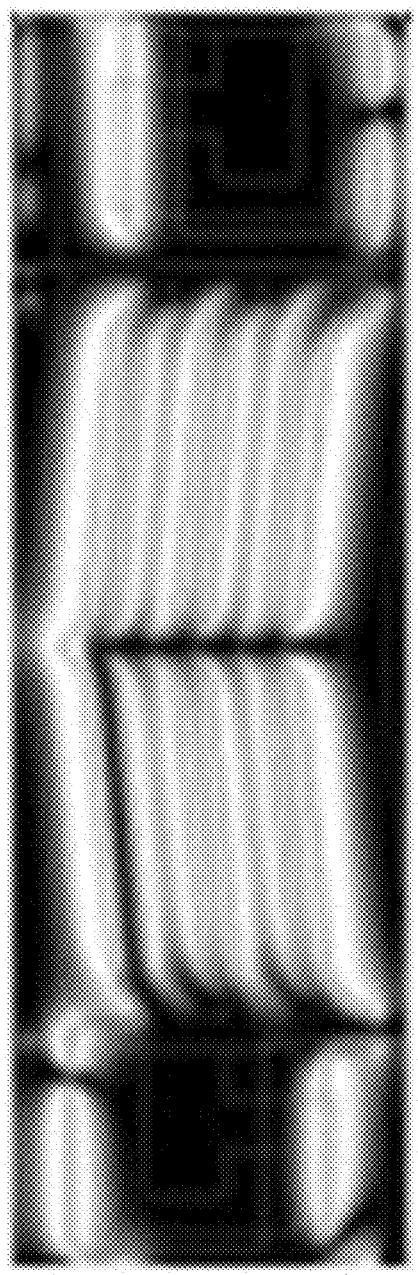
Figure 12G:
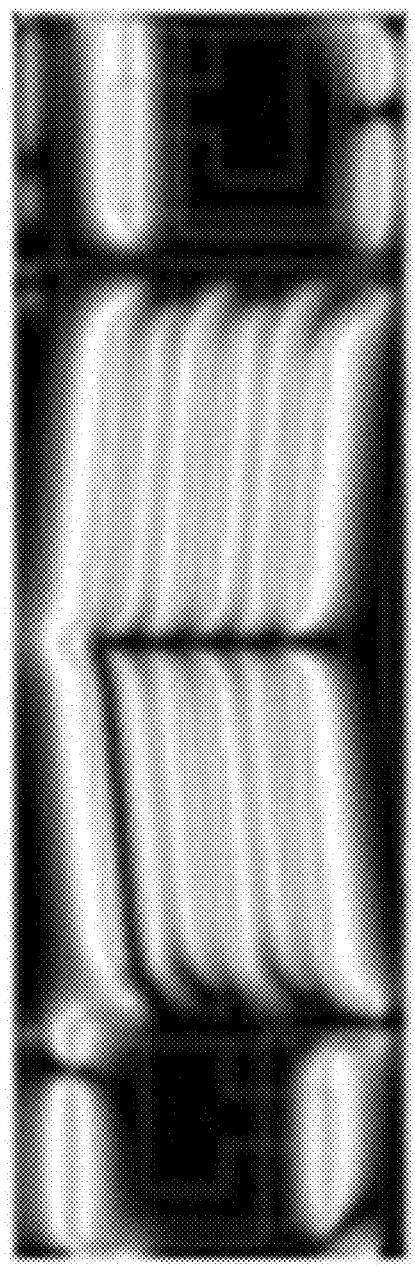
Figure 12H:
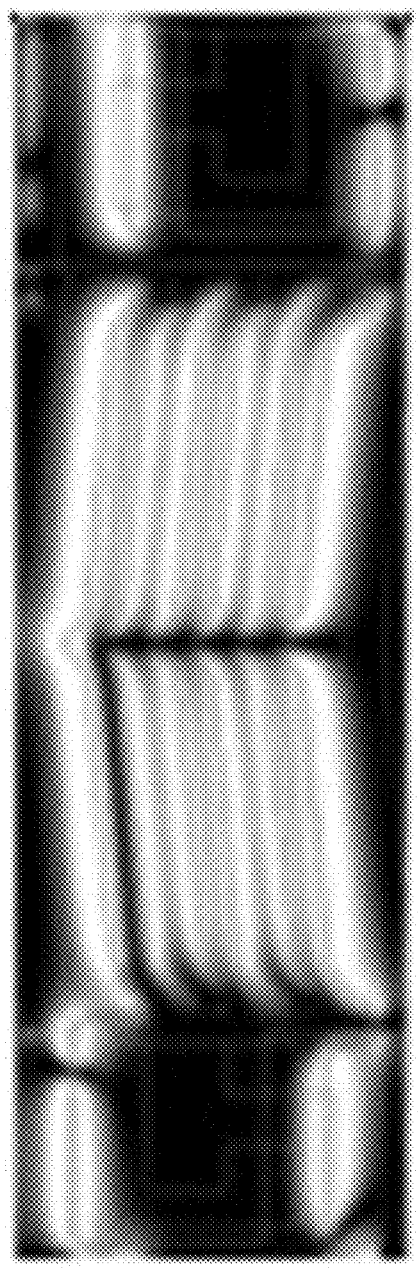
Figure 12I:
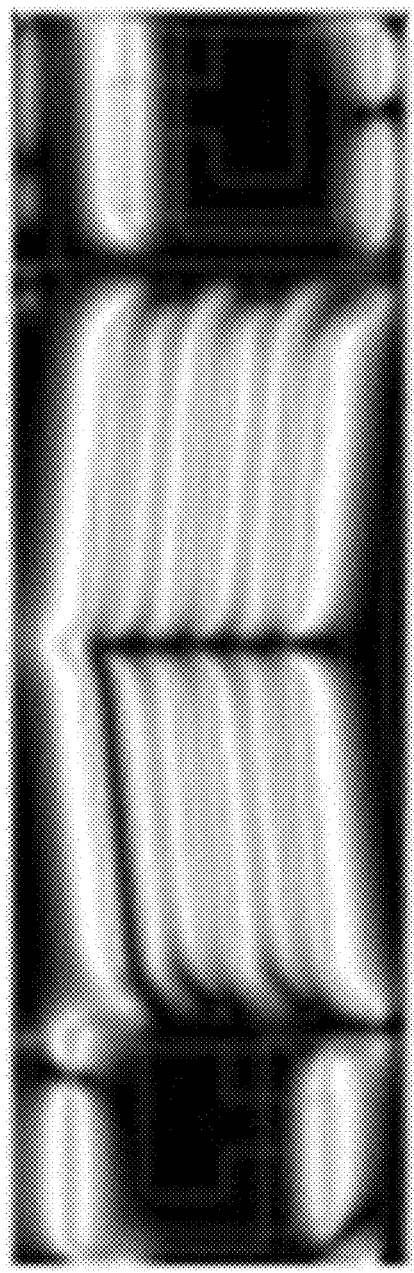

Now, experimental examples will be described with reference to FIG. 10A and FIG. 10B, FIG. 11A to FIG. 11I, and FIG. 12A to FIG. 12I. FIG. 10A and FIG. 10B are drawings showing a shape of branch electrodes of the liquid crystal display according to an experimental example of the present invention. FIG. 11A to FIG. 11I are drawings showing a result of transmittance of a portion of the liquid crystal display according to an experimental example of the present invention. FIG. 12A to FIG. 12I are drawings showing a result of transmittance of a portion of the liquid crystal display according to an experimental example of the present invention.

The branch electrodes formed in the first case in which the center portions CS of the branch electrodes have a constant angle with the vertical reference line (reference line extending in a y direction) forming an angle of 90° with the extension direction (x direction) of the gate line 121 as the known liquid crystal display (LCD), and in the second case in which the outermost branch electrode has a different angle than the other branch electrodes with the vertical reference line and the distance between the center portion CS of the outermost branch electrode and the main branch portion MS of the outermost branch electrode is larger than that the distance between the center portion of the other branch electrodes and the main branch portion MS of the other branch electrodes as the liquid crystal display (LCD) according to an exemplary embodiment of the present invention are depicted FIG. 10A and FIG. 10B. FIG. 10A represents the shape of branch electrodes of the first case, and FIG. 10B represents the shape of branch electrodes of the second case.

In the experimental example, the pixel electrode and the common electrode were supplied with predetermined voltages after the branch electrodes were formed in the first case and the second case, and then the transmittances were measured by an electron microscope with a time period of about 100 ms. The results are depicted in FIG. 11A to FIG. 11I and FIG. 12A to FIG. 12I. The transmittance results regarding the first case are shown in FIG. 11A to FIG. 11I, and the transmittance results regarding the second case are shown in FIG. 12A to FIG. 12I.

Referring to FIG. 11A to FIG. 11I, in the first case in which the center portions CS of the branch electrodes have a constant angle with the vertical reference line (reference line extending in a y direction) forming an angle of 90° with the extension direction (x direction) of the gate line 121 as the known liquid crystal display (LCD), a display quality deteriorated portion depicted as a black portion in a lower portion of the pixel area remained after the passage of the specified time period.

On the other hand, referring to FIG. 12A to FIG. 12I, in the second case in which the outermost branch electrode has a different angle than the other branch electrodes with the vertical reference line, and the distance between the center portion CS of the outermost branch electrode and the main branch portion MS of the outermost branch electrode is greater than the distance between the center portion of the other branch electrodes and the main branch portion MS of the other branch electrodes as the liquid crystal display (LCD) according to an exemplary embodiment of the present invention, the display quality deteriorated portion depicted as a black portion disappeared after about 500 ms passed.

In the liquid crystal display (LCD) according to an exemplary embodiment of the present invention, the irregular behavior of the liquid crystal molecules adjacent to the center portion of the pixel area disappeared gradually.

Now, referring to Table 1, another experimental example will be described. In this experimental example, the distance of the protruded portion of the center portion of the outermost branch electrode and the angle between the center portion of the outermost branch electrode and the extension direction of the gate line were varied, and maximum driving voltages under which the irregular behaviors of the liquid crystal molecules adjacent to the center portion of the outermost branch electrode were not generated were measured. More specifically, in this experimental example, first differences (aa) between the first distance (a) between the center portion CS of the outermost branch electrode and the main branch portion MS of the outermost branch electrode and the second distance (b) between the center portion CS of the other branch electrodes and the main branch portion MS of the other branch electrodes were about 0 μm, about 1 μm, about 2 μm, and about 3 μm. In addition, the center portions of the other branch electrodes, other than the outermost branch electrode, were formed to have an angle of about 45 degree with the extension direction of the gate line, and the center portion of the outermost branch electrode were formed to have angles (bb) of about 15 degrees, about 30 degrees, about 45 degrees, and about 60 degrees. Regarding each case, the maximum driving voltages under which the irregular behaviors of the liquid crystal molecules adjacent to the center portion of the outermost branch electrode were not generated were measured. The measured results are represented in Table 1.

TABLE 1

| | | Bb (°) | | | |
|---|---|---|---|---|---|
| | | 15 | 30 | 45 | 60 |
| Aa (μm) | 0 | 3.6 V | 3.4 V | 3.2 V | 3.2 V |
| | 1 | 4.0 V | 4.0 V | 3.6 V | — |
| | 2 | 4.0 V | 4.0 V | — | — |
| | 3 | 4.0 V | — | — | — |

In general, as the driving voltages applied to the liquid crystal molecules are larger, the rotation angles of the liquid crystal molecules are larger, and accordingly, it is more difficult for the rotated liquid crystal molecules to be rearranged toward the initial alignment states. Therefore, as the driving voltages applied to the liquid crystal molecules are larger, the irregular behavior of the liquid crystal molecules is generated more often. For preventing the irregular behavior of the liquid crystal molecules, the driving voltages applied to the liquid crystal molecules may be reduced. However, if the driving voltages applied to the liquid crystal molecules are reduced, the maximum transmittance of the liquid crystal display (LCD) is also decreased. Accordingly, it is important to reduce the irregular behavior of the liquid crystal molecules and increase the driving voltages applied to the liquid crystal molecules to increase the maximum transmittance of the liquid crystal display without causing the irregular behavior of the liquid crystal molecules.

Referring to Table 1, as the liquid crystal display (LCD) according to an exemplary embodiment of the present invention in which the first distance (a) between the center portion CS of the first outermost branch electrode 192*a* and the main branch portion MS of the first outermost branch electrode 192*a* is greater than the second distance (b) between the center portion CS of the other first branch electrodes 192 and the main branch portion MS of the other first branch electrodes 192 by about 1 μm to about 2 μm, in the case in which the first differences (aa) between the first distance (a) between the center portion CS of the outermost branch electrode and the main branch portion MS of the outermost branch electrode and the second distance (b) between the center portion CS of the other branch electrodes and the main branch portion MS of the other branch electrodes were about 1 μm and about 2 μm, the maximum driving voltages under which the irregular behavior of the liquid crystal molecules adjacent to the center portion of the outermost branch electrode was not generated was about 4.0 V. This value is relatively large. In addition, as the liquid crystal display (LCD) according to an exemplary embodiment of the present invention in which the center portion CS of the outermost branch electrode has an angle of less than 45 degrees with the extension direction of the gate line, in the case that the center portion of the outermost branch electrode were formed to have angles (bb) of about 15 degrees and about 30 degrees, the maximum driving voltages under which the irregular behaviors of the liquid crystal molecules adjacent to the center portion of the outermost branch electrode were not generated was about 4.0 V. This value is relatively large.

As described above, as the liquid crystal display (LCD) according to an exemplary embodiment of the present invention, in the cases in which the first distance (a) between the center portion CS of the first outermost branch electrode 192*a* and the main branch portion MS of the first outermost branch electrode 192*a* is greater than the second distance (b) between the center portion CS of the other first branch electrodes 192 and the main branch portion MS of the other first branch electrodes 192 by about 1 μm to about 2 μm, and the center portion CS of the outermost branch electrode has an angle of about 15 degrees to about 30 degrees with the extension direction of the gate line, the irregular behavior of the liquid crystal molecules adjacent to the center portion of the outermost branch electrode is not generated while the driving voltages have relatively large values.

Accordingly, in the cases in which the first distance (a) between the center portion CS of the first outermost branch electrode 192*a* and the main branch portion MS of the first outermost branch electrode 192*a* is larger than the second distance (b) between the center portion CS of the other first branch electrodes 192 and the main branch portion MS of the other first branch electrodes 192 by about 1 μm to about 2 μm, and the center portion CS of the outermost branch electrode has an angle of about 15 degrees to about 30 degrees with the extension direction of the gate line, the relatively large driving voltages may be applied to the liquid crystal layer to increase the maximum transmittance of the liquid crystal display without causing the irregular behavior of the liquid crystal molecules.

According to the liquid crystal display (LCD) of an exemplary embodiment of the present invention, two field generating electrodes are disposed on one substrate, and at least one of the two field generating electrodes has branch electrodes defined by cutouts such that irregular behavior of the liquid crystal molecules disposed adjacent to an edge of the outmost branch electrode can be prevented. Therefore, the reduction of the transmittance of the liquid crystal display generated by this irregular behavior of the liquid crystal molecules adjacent to the center portion of the outermost branch electrode can also be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
   a first substrate;
   a gate line and a data line disposed on the first substrate;
   a first electrode disposed on the first substrate;
   an insulating layer disposed on the first electrode;
   a second electrode disposed on the insulating layer, overlapping the first electrode, and comprising a plurality of branch electrodes;
   a second substrate opposing the second first substrate; and
   a liquid crystal layer disposed between the first substrate and the second substrate and comprising a plurality of liquid crystal molecules,
   wherein:
   the liquid crystal molecules are aligned to have pretilt angles in an alignment direction;
   the plurality of branch electrodes comprise an outermost branch electrode disposed adjacent to the data line;
   each of the plurality of branch electrodes, except for the outermost branch electrode, comprises a main branch portion forming a first angle with the alignment direction and a center portion forming a second angle with the alignment direction, respectively;
   the outermost branch electrode comprises a first main branch portion and a first center portion, the first center portion protruding toward the data line;
   the first main branch portion and the alignment direction form the same angle as the first angle of the main branch portion; and
   the first center portion and the alignment direction form a different angle from the second angle of the center portion.

2. The liquid crystal display of claim 1,
   wherein:
   the first center portion of the outermost branch electrode forming a fourth angle with the alignment direction; and
   the fourth angle is greater than the second angle.

3. The liquid crystal display of claim 2, wherein the first center portion forms an angle of about 15 degrees to about 30 degrees with a direction parallel to the gate line.

4. The liquid crystal display of claim 2, wherein a first distance between the first center portion and the main branch portion of the outermost branch electrode along the direction parallel to the gate line is greater than a second distance between the center portion of the other branch electrodes and the main branch portion of the other branch electrodes than the outermost branch electrode.

5. The liquid crystal display of claim 4, wherein the first distance is greater than the second distance by about 1 μm to about 2 μm.

6. The liquid crystal display of claim 5, wherein the second angle is greater than the first angle.

7. The liquid crystal display of claim 6, wherein the plurality of branch electrodes comprise an edge portion forming a third angle with the alignment direction, respectively, and the third angle is greater than the first angle.

8. The liquid crystal display of claim 7, wherein:
the first electrode has a planar shape; and
the planar shaped first electrode overlaps the plurality of branch electrodes of the second electrode.

9. The liquid crystal display of claim 3, wherein the second angle is greater than the first angle.

10. The liquid crystal display of claim 9, wherein:
the plurality of branch electrodes comprise an edge portion forming a third angle with the alignment direction; and
the third angle is greater than the first angle.

11. The liquid crystal display of claim 10, wherein:
the first electrode has a planar shape; and
the planar shaped first electrode overlaps the plurality of branch electrodes of the second electrode.

12. The liquid crystal display of claim 3, wherein:
the plurality of branch electrodes comprise an edge portion forming a third angle with the alignment direction; and
the third angle is greater than the first angle.

13. The liquid crystal display of claim 12, wherein:
the first electrode has a planar shape; and
the planar shaped first electrode overlaps the plurality of branch electrodes of the second electrode.

14. The liquid crystal display of claim 1, further comprising a gate line and a data line disposed on the first substrate,
wherein:
a first distance between the first center portion and the main branch portion of the outermost branch electrode along the direction parallel to the gate line is greater than a second distance between the center portion of the other branch electrodes and the main branch portion of the other branch electrodes than the outermost branch electrode.

15. The liquid crystal display of claim 14, wherein the first distance is greater than the second distance by about 1 μm to about 2 μm.

16. The liquid crystal display of claim 15, wherein the second angle is greater than the first angle.

17. The liquid crystal display of claim 16, wherein:
the plurality of branch electrodes comprise an edge portion forming a third angle with the alignment direction; and
the third angle is greater than the first angle.

18. The liquid crystal display of claim 17, wherein:
the first electrode has a planar shape; and
the planar-shaped first electrode overlaps the plurality of branch electrodes of the second electrode.

19. The liquid crystal display of claim 1, wherein the second angle is greater than the first angle.

20. The liquid crystal display of claim 19, wherein:
the plurality of branch electrodes comprise an edge portion forming a third angle with the alignment direction; and
the third angle is greater than the first angle.

21. The liquid crystal display of claim 20, wherein:
the first electrode has a planar shape; and
the planar-shaped first electrode overlaps the plurality of branch electrodes of the second electrode.

22. The liquid crystal display of claim 1, wherein:
the plurality of branch electrodes comprise an edge portion forming a third angle with the alignment direction; and
the third angle is greater than the first angle.

23. The liquid crystal display of claim 22, wherein:
the first electrode has a planar shape; and
the planar-shaped first electrode overlaps the plurality of branch electrodes of the second electrode.

* * * * *